US010666080B2

(12) United States Patent
Koyama et al.

(10) Patent No.: US 10,666,080 B2
(45) Date of Patent: May 26, 2020

(54) CELL TYPE POWER SUPPLY DEVICE HAVING WIRELESS COMMUNICATION FUNCTION

(71) Applicant: NOVARS INC., Tokyo (JP)

(72) Inventors: Kazuhiro Koyama, Chiba (JP); Akihiro Okabe, Tokyo (JP); Tetsuya Nobe, Tokyo (JP)

(73) Assignee: NOVARS INC., Tokyo (JP)

( * ) Notice: Subject to any disclaimer, the term of this patent is extended or adjusted under 35 U.S.C. 154(b) by 186 days.

(21) Appl. No.: 16/029,706

(22) Filed: Jul. 9, 2018

(65) Prior Publication Data
US 2018/0358817 A1    Dec. 13, 2018

Related U.S. Application Data

(63) Continuation of application No. PCT/JP2016/085648, filed on Nov. 30, 2016.

(30) Foreign Application Priority Data

Jan. 15, 2016   (JP) ................................. 2016-006095

(51) Int. Cl.
*H02J 7/00*     (2006.01)
*H01M 10/42*    (2006.01)
(Continued)

(52) U.S. Cl.
CPC ........... *H02J 7/008* (2013.01); *H01M 6/5044* (2013.01); *H01M 10/4257* (2013.01);
(Continued)

(58) Field of Classification Search
CPC ....................................................... H02J 7/00
See application file for complete search history.

(56) References Cited

U.S. PATENT DOCUMENTS

2003/0096158 A1* 5/2003 Takano ............... H01M 10/482
                                                        429/90
2011/0181233 A1* 7/2011 Mino ...................... B60L 53/51
                                                        320/101

FOREIGN PATENT DOCUMENTS

JP    H10-209953 A    8/1998
JP    2003-164066 A   6/2003
(Continued)

OTHER PUBLICATIONS

International Search Report issued in PCT/JP2016/085648 dated Jan. 31, 2017 with English Translation (5 pages).
(Continued)

*Primary Examiner* — Robert Grant
(74) *Attorney, Agent, or Firm* — Nakanishi IP Associates, LLC (57) ABSTRACT

An objective of the present invention is to realize a voltage detection function in a cell type power supply device having a wireless communication function. A cell type power supply device 1 is attached to a cell box 12 of an external load device 11 alone or in series with another external cell 13. A housing 18 has a shape and dimensions based on a cell standard, and front and rear terminals of the external cell held in a cell holder 2 in the housing 18 are to be in contact with an inner positive terminal 5 and an inner negative terminal 6. An outer positive terminal 3 connected to the inner positive terminal is provided on a front end surface of the housing, and an outer negative terminal 4 connected to the inner negative terminal is provided on a rear end surface of the housing. An output transistor 32 is interposed at least one of between the inner negative terminal and the outer negative terminal and between the inner positive terminal and the outer positive terminal. An RFIC 37 generates a control signal of the output transistor in accordance with a signal received via an antenna. Voltage detection units 41
(Continued)

and 43 detect at least one of a voltage between the inner positive terminal and GND, and a voltage between the outer negative terminal and GND.

7 Claims, 7 Drawing Sheets

(51) Int. Cl.
*H01M 10/44* (2006.01)
*H01M 6/50* (2006.01)
*H01M 10/48* (2006.01)
*H02J 7/04* (2006.01)

(52) U.S. Cl.
CPC ......... *H01M 10/44* (2013.01); *H01M 10/482* (2013.01); *H02J 7/00* (2013.01); *H02J 7/045* (2013.01); *H01M 2010/4271* (2013.01); *H01M 2010/4278* (2013.01)

(56) References Cited

FOREIGN PATENT DOCUMENTS

| | | |
|---|---|---|
| JP | 3143765 U | 8/2008 |
| JP | 2010-239517 A | 10/2010 |
| JP | 2011-067004 A | 3/2011 |
| JP | 2011-155820 A | 8/2011 |
| JP | 2014-013210 A | 1/2014 |
| JP | 2015-177939 A | 10/2015 |

OTHER PUBLICATIONS

Written Opinion of International Searching Authority issued in PCT/JP2016/085648 dated Jan. 31, 2017 (5 pages).

* cited by examiner

CELL TYPE POWER SUPPLY DEVICE HAVING WIRELESS COMMUNICATION FUNCTION

FIELD

Embodiments described herein relate generally to a cell type power supply device having a wireless communication function.

BACKGROUND

Patent Literature 1 discloses a wireless receiver drive that is attachable in a cell box of an external load of an electric toy etc. This wireless receiver drive is configured as a so-called switching power supply and changes, with a wireless module, a duty cycle of a drive signal of a transistor interposed between a held cell and an external terminal in accordance with a user instruction received via a wireless receiving unit, thereby changing a driving voltage to an external load device, whereby operation of the external load device such as an electric toy can be controlled. The wireless receiver drive further has a function of controlling power supply of the wireless receiving unit in accordance with an external switch of the external load device, thereby realizing an effect of preventing the cell from exhausting.

There are various demands such as preventing a cell from being further exhausted, as well as grasping a timing to swap a cell.

CITATION LIST

Patent Literature

Patent Literature 1: Japanese Patent Laid-Open No. 2015-177939

SUMMARY OF INVENTION

Technical Problem

An objective of the present invention is to provide a voltage detection function to a cell type power supply device having a wireless communication function, the cell type power supply device being capable of realizing prevention of a cell from exhausting, grasping of a timing to swap a cell, and the like.

Solution to Problem

A cell type power supply device having a wireless communication function according to the present embodiment is attached alone or in series with another external cell to a cell box of an external load device. The cell type power supply device includes: a housing having a shape and dimensions based on a cell standard; a cell holder that holds an internal cell in the housing, and includes an inner positive terminal and an inner negative terminal that are brought into contact with front and rear terminals of the held internal cell; an outer positive terminal provided on a front end surface of the housing and connected to the inner positive terminal; an outer negative terminal provided on a rear end surface of the housing and connected to the inner negative terminal; an output transistor interposed at least one of between the inner negative terminal and the outer negative terminal and between the inner positive terminal and the outer positive terminal; an antenna that communicates with an external information device; a control unit that generates a control signal of the output transistor in accordance with a signal received via the antenna; and a voltage detection unit that detects at least one of voltage between the inner positive terminal and GND, and voltage between the outer negative terminal and GND.

DETAILED DESCRIPTION

Hereafter, a cell type power supply device having a wireless function according to the present embodiment will be described with reference to the drawings. In the following description, the same reference numerals denote components having substantially identical functions and structures, and the repeated description thereof is made only when necessary.

Figure 1:
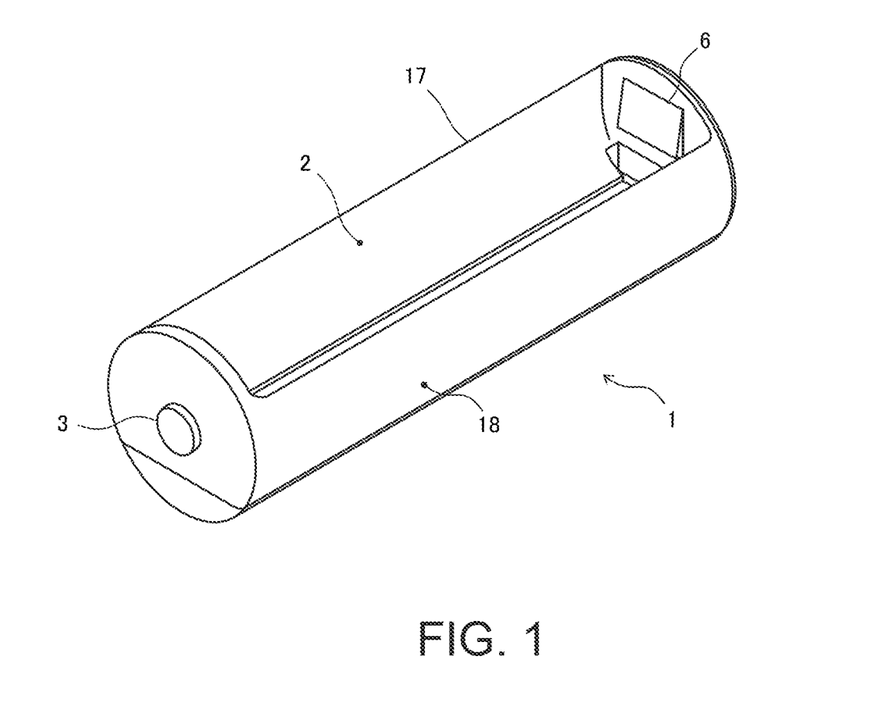
FIG. 1 is a perspective view showing an exterior of a cell type power supply device having a wireless communication function according to a first embodiment of the present invention.
Figure 2:
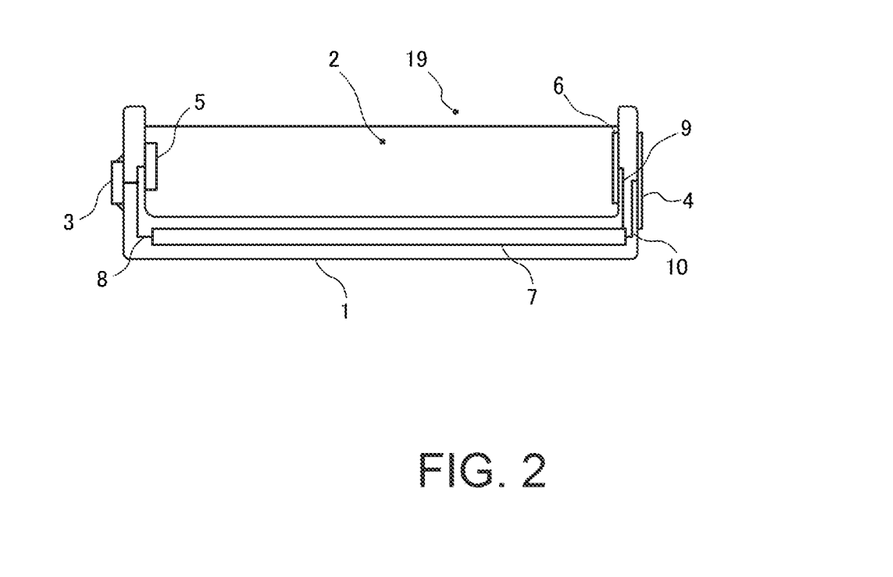
FIG. 2 is a diagram showing an internal configuration of the cell type power supply device of FIG. 1.

FIG. 1 is a perspective view showing an exterior of a cell type power supply device 1 having a wireless function according to an embodiment of the present invention. FIG. 2 is a plan view showing a mode of use of the cell type power supply device 1 of FIG. 1. The cell type power supply device 1 having a wireless function according to the present embodiment (hereinafter, simply referred to as a cell type power supply device) 1 has a shape and external dimensions based on a cell standard. Typically, the cell type power supply device 1 according to the present embodiment has a cylinder having a height and diameter based on the AA size cell standard. However, the cell type power supply device 1 may have a shape and dimensions based on another cell standard. Here, descriptions are provided on the assumption that the cell type power supply device 1 according to the present embodiment is based on the AA standard.

A main body 17 of the cell type power supply device 1 is wrapped by a columnar housing 18 having the same shape and dimensions as those of the AA size cell standard. A circle conductive plate is attached as an outer positive terminal 3 at the center of a top surface (also referred to as a front end surface) of the main body 17. A circle conductive plate is attached as an outer negative terminal 4 at the center of a bottom surface (also referred to as a rear end surface) of the main body. A portion of the peripheral surface of the housing 18 is cut in an oval shape. The length of a cut portion 19 is equal to that of AAA cells, and the width is a little larger than that of AAA cells. A user can insert an AAA cell into or remove it from a cell holder 2 through the cut portion 19. The shape of the cell holder 2 is a columnar space having a length and diameter based on the AAA standard. The central axis of the cell holder 2 is offset in a radial direction with respect to the columnar central axis of the cell type power supply device 1. This offset provides a small space between the housing 18 and the cell holder 2. In this small space, a substrate 7 that realizes various functions of the cell type power supply device 1 is mounted.

A conductive plate is attached as an inner positive terminal 5 at the center of the front end of the cell holder 2, i.e., on the same side as the outer positive terminal 3. A conductive plate having spring property is attached as an inner negative terminal 6 at the center of the rear end of the cell holder 2, i.e., on the same side as the outer negative terminal 4. The positive terminal of the AAA cell held in the cell holder 2 is brought into contact with the inner positive terminal 5, and the negative terminal of the AAA cell is brought into contact with the inner negative terminal 6. The inner positive terminal 5 is connected to the outer positive terminal 3 and the substrate 7 via a distribution cable 8. The inner positive terminal 5 and the outer positive terminal 3 may be a common conductive plate. The inner negative terminal 6 is connected to the substrate 7 via a distribution cable 9. The outer negative terminal 4 is connected to the substrate 7 via a distribution cable 10.

Figure 3:
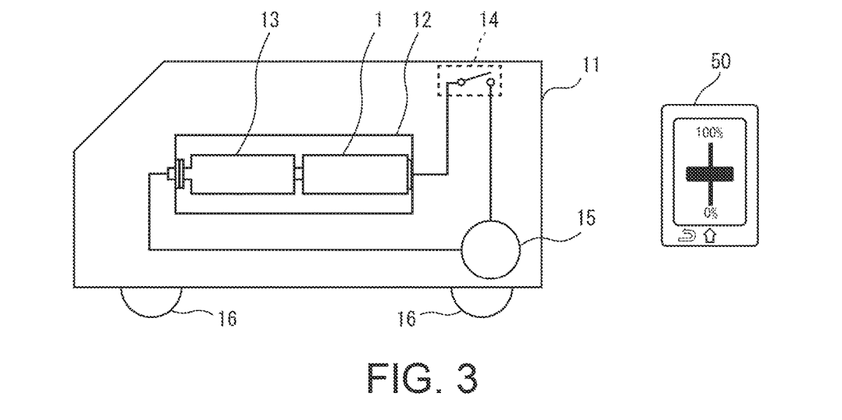
FIG. 3 is a diagram showing a mode of use of the cell type power supply device of FIG. 1.

FIG. 3 is a diagram showing a mode of use of the cell type power supply device 1 of FIG. 1. As shown in FIG. 3, the cell type power supply device 1 is attached alone, or in series or in parallel with an external cell 13 to a cell box 12 of an external load device 11 driven by an AA cell. The external load device 11 is such as an external load device, an electric tools toy, a disaster prevention sensor, a security sensor, a flashlight, a bicycle light, a cell-powered cooker, an electrical float, an electric pet feeding device, a cell-powered fan, or a cell-powered hand soap dispenser. Here, the external load device 11 is described as an external load device driven by a motor 15. The external load device 11 includes the cell box 12. The cell type power supply device 1 and another one AA cell 13 are attached in series with the cell box 12. The cell box 12 is electrically connected to a motor 15 via an external switch 14. A wheel 16 is connected to the motor 15 via a transmission mechanism. When the external switch 14 is turned on, an electrical connection between the motor 15 and the cell box 12 is secured. When the external switch 14 is turned off, the motor 15 is electrically cut from the cell box 12.

An external information device 50 is typically mobile digital electronic equipment, such as a smartphone, a portable telephone, a tablet terminal, or a radio control communication device, which has a communication function and an operation panel function, etc. The cell type power supply device 1 according to the present embodiment has a wireless communication function and is wirelessly connected to the external information device 50. An instruction to set a power output to any value within a range of 0% to 100% (output instruction) is wirelessly transmitted from the external information device 50 to the cell type power supply device 1. As will be described later, an output transistor is interposed between the inner negative terminal 6 and the outer negative terminal 4 of the cell holder 2 of the cell type power supply device 1. By the PWM (pulse width signal modulation) system, the cell type power supply device 1 adjusts a power output by changing a duty cycle of a gate control signal (output control signal) of the output transistor in accordance with the output instruction from the external information device 50.

Figure 4:
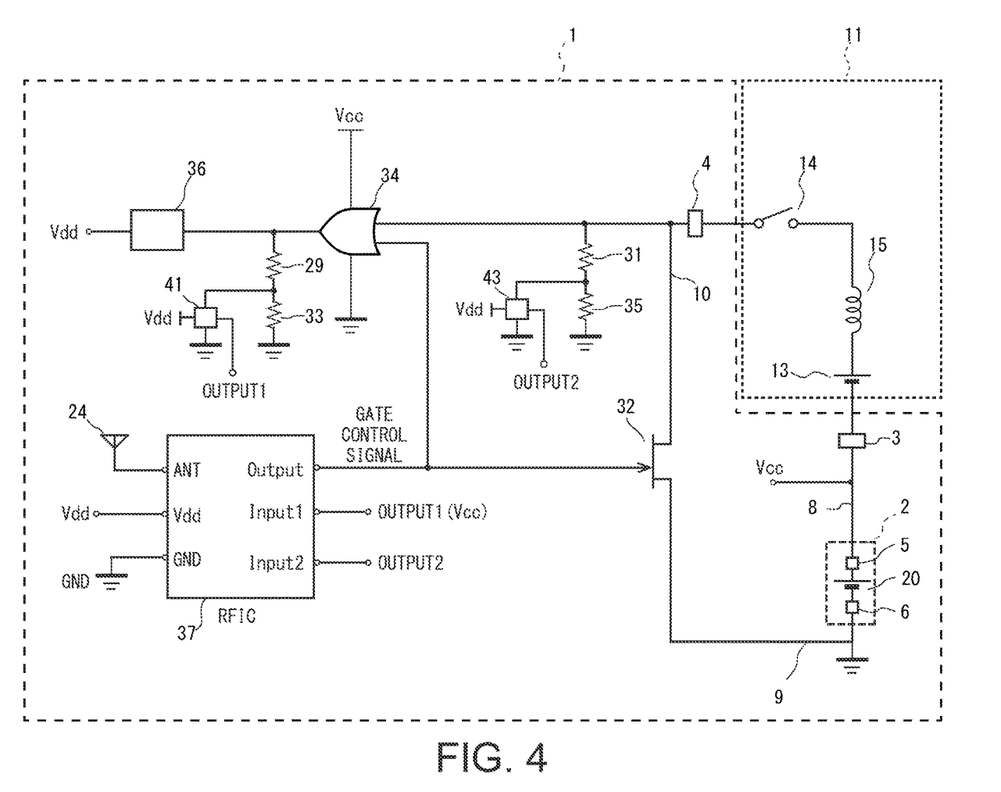
FIG. 4 is an equivalent circuit diagram of the cell type power supply device of FIG. 1.

FIG. 4 is an equivalent circuit diagram of the cell type power supply device of FIG. 1. Here, the cell type power supply device 1 and one external cell 13 are attached to the cell box 12 of the external load device 11 with the cell type power supply device 1 connected in series to the external cell 13. To the cell holder 2 of the cell type power supply device 1, an internal cell 20 is attached. The circuit of the cell type power supply device 1 according to the present embodiment includes an output transistor 32, resistors 33 and 35, a logical disjunction circuit (OR circuit) 34, an RFIC 37, DC-DC converter 36, and analog/digital converters (ADCs) 41 and 43. Those electronic components are mounted on the substrate 7.

The output transistor 32 is typically an N-channel MOSFET, and is interposed between the inner negative terminal 6 and outer negative terminal 4 in the circuit. Specifically, the source terminal of the output transistor 32 is connected to the inner negative terminal 6 via the distribution cable 9. The section between the source terminal of the output transistor 32 and the inner negative terminal 6 is connected to GND. The drain terminal of the output transistor 32 is connected to the outer negative terminal 4 via the distribution cable 10. The gate terminal of the output transistor 32 is connected to the Output terminal of the RFIC 37.

The output transistor 32 may be a P-channel MOSFET. In that case, the output transistor 32 is interposed between the inner positive terminal 5 and the outer positive terminal 3 in the circuit. When the output transistor 32 is the P-channel MOSFET, high-level/low-level is substituted for low-level/high-level, respectively in the following description. In addition, the output transistor 32 may be a bipolar transistor. In that case, a gate control signal described below is substituted for a base control signal. Here, the output transistor 32 is described as an N-channel MOSFET.

The inner positive terminal 5 is directly connected to the outer positive terminal 3. In addition, the inner positive terminal 5 is connected to the input terminal of the DC-DC converter 36. The DC-DC converter 36 raises the voltage Vcc of the AAA cell attached in the cell holder 2 to the power supply voltage Vdd of, for example, 3.0 V for internal circuit operation. The RFIC 37 described later and the comparator 30 are driven by the power supply voltage Vdd. However, if the RFIC 37 and ADCs 41 and 43 operate at Vcc (1.5 V) or lower, the DC-DC converter 36 is not necessary.

Between the DC-DC converter 36 and the inner positive terminal 5, the OR circuit 34 is interposed. The OR circuit 34 has two input terminals and one output terminal. One of the input terminals (first input terminal) is connected to the outer negative terminal 4. The other of the input terminals (second input terminal) is connected to the Output terminal of the RFIC 37. The output terminal of the OR circuit 34 is connected to the input terminal of the DC-DC converter 36. When the OR circuit 34 is turned on, that is, when at least one of the two input terminals receives the high-level, the input terminal of the DC-DC converter 36 is brought into conduction with the inner positive terminal 5, and when the OR circuit 34 is turned off, that is, when the two input terminals each receive the low-level, the DCDC converter 36 is not driven. The RFIC 37 and other components driven by the power supply voltage Vdd operate in accordance with ON/OFF of the DC-DC converter 36.

Specifically, the external switch 14 is OFF, the first and second input terminals of the OR circuit 34 receive the low-level, and the DC-DC converter 36 does not operate. In response to the external switch 14 being turned on, the first input terminal receives the high-level, and the OR circuit 34 is turned on. When the external switch 14 is ON, and the output transistor 32 is OFF, the first input terminal continuously receives the high-level turned on, and the OR circuit 34 is kept ON. In response to the output transistor 32 being turned on with the external switch 14 being ON, the first input terminal of the OR circuit 34 receives the low-level, while the high-level of the gate control signal for turning on the output transistor 32 is input to the second input terminal, so that the OR circuit 34 is kept ON. Accordingly, the DC-DC converter 36 is driven in accordance with ON/OFF of the external switch 14. Therefore, the communication with the external information device 50 by the RFIC 37 is turned on/off in accordance with ON/OFF of the external switch 14.

The resistor 33 lies in a subsequent stage of the OR circuit 34 and is interposed between the inner positive terminal 5 and GND. The analog/digital converter 41 (ADC 41) is connected in parallel to the resistor 33 and measures voltage between the inner negative terminal 6 and the inner positive terminal 5. As shown in FIG. 4, a resistor 29 may be connected in series to the resistor 33 to divide input voltage so that a voltage equal to or higher than a measurable voltage for the ADC 41 (here, a driving voltage Vdd) is not input to the ADC 41. The resistance values of the resistor 33 and the resistor 29 are adjusted in advance according to the specifications of the ADC 41, for example, the reference voltage of the ADC 41, the resolution of the ADC 41, and a detected voltage. In addition, the ADC 41 may include a microcomputer. The resistor 33 and the ADC 41 form a voltage detection unit. The ADC 41 is electrically separated from the external cell 13. Since the resistor 33 is disposed in the subsequent stage of the OR circuit 34, voltage detecting processing by the ADC 41 is performed in accordance with ON/OFF of the external switch 14. When the external switch 14 is ON, and the output transistor 32 is OFF, a voltage V1 detected by the ADC 41 corresponds to an open-circuit voltage of the internal cell 20. When the external switch 14 is ON, and the output transistor 32 is ON, the voltage V1 detected by the ADC 41 corresponds to a voltage of the internal cell 20 being energizing. Voltage data converted by the ADC 41 in the form of digital data is input to an Input 1 terminal of the RFIC 37. It is sufficient that the Input 1 terminal of the RFIC 37 receives a voltage between both terminals of the internal cell 20, and therefore the Input 1 terminal of the RFIC 37 may be directly connected to the inner positive terminal 5.

The resistor 35 is interposed between the outer negative terminal 4 and GND. The analog/digital converter 43 (ADC 43, a voltage detection unit 43) is connected in parallel to the resistor 35 and measures voltage between GND and the outer negative terminal 4. As shown in FIG. 4, a resistor 31 may be connected in series to the resistor 35 to divide input voltage so that a voltage equal to or higher than a measurable voltage for the ADC 43 (here, the driving voltage Vdd) is not input to the ADC 43. The resistance values of the resistor 35 and the resistor 31 are adjusted in advance according to the specifications of the ADC 43, for example, the reference voltage of the ADC 43, the resolution of the ADC 43, and a detected voltage. In addition, the ADC 43 may include a microcomputer. The resistor 35 and the ADC 43 form a voltage detection unit. Here, the cell type power supply device 1 and the external cell 13 are held in the cell box 12 with the cell type power supply device 1 connected in series to the external cell 13. When the output transistor 32 is OFF, a voltage V2 measured by the ADC 43 corresponds to a total open-circuit voltage of the internal cell 20 of the cell type power supply device 1 and the external cell 13 connected in series to the cell type power supply device 1. Voltage data converted by the ADC 43 in the form of digital data is input to an Input 2 terminal of the RFIC 37.

The RFIC 37 generally controls the cell type power supply device 1. The ANT terminal of the RFIC 37 is connected to an antenna 24 for wireless communication. The Output terminal of the RFIC 37 is connected to an input terminal of the OR circuit 34 and the gate terminal of the output transistor 32. The Input 1 terminal of the RFIC 37 is connected to the output terminal of the ADC 41, and the Input 2 terminal thereof is connected to the output terminal of the ADC 43.

The RFIC 37 functionally includes a communication unit, a drive signal generation unit, and a control unit, etc. The communication unit performs wireless communication conforming to Bluetooth® standard with the external information device 50 via the antenna 24 for wireless communication in accordance with control of the control unit. The RFIC 37 may perform wireless communication conforming to other wireless communication standards, for example, a wireless LAN standard. The communication unit receives a code wireless signal indicating a motor output instruction value from the external information device 50 via the antenna 24 for wireless communication. The motor output instruction value is, for example, a value of a proportion within 0% to 100% selected by a user operating the external information device 50.

The drive signal generation unit generates a motor drive signal corresponding to the received motor output instruction value in accordance with control of the control unit. Here, the motor drive signal is provided as a PWM (Pulse Width Signal Modulation) signal. When the motor output instruction value is 0%, the drive signal generation unit generates a 0% duty cycle (only low level) PWM signal. When the motor output instruction value is 100%, the drive signal generation unit generates a 100% duty cycle (only high level) PWM signal. When the motor output instruction value is 50%, the drive signal generation unit generates a 50% duty cycle (1-to-1 low level-to-high level ratio) signal. The PWM signal generated by the drive signal generation unit is input to the output transistor 32 as a gate control signal. The high-level of the PWM signal generated by the drive signal generation unit refers to a voltage value sufficiently higher than the threshold voltage Vth of the output transistor 32, and the output transistor 32 is ON. The low-level refers to a voltage value sufficiently lower than the threshold voltage Vth of the output transistor 32, and the output transistor 32 is OFF.

The output transistor 32 functions as a switching element between the inner negative terminal 6 and the outer negative terminal 4 of the cell type power supply device. The source terminal of the output transistor 32 is connected to the inner negative terminal 6, the drain terminal is connected to the outer negative terminal 4, and the gate terminal is connected to the Output terminal of the RFIC 37. The ON/OFF of the output transistor 32 is controlled by the voltage (gate voltage) applied by the gate control signal input to the gate.

When the gate voltage is in a saturation region sufficiently higher than the threshold voltage Vth, a channel is formed between the source and drain, and the maximum drain current flows. In this state, the output transistor 32 is ON. When the output transistor 32 is turned on, current flows between the outer positive terminal 3 and the outer negative terminal 4 of the cell type power supply device 1 via the internal cell 20. If the external switch 14 of the external load device 11 is ON, current flows between the outer positive terminal 3 and the outer negative terminal 4 of the cell type power supply device 1, driving the motor 15 of the external load device 11. In contrast, when the gate voltage is sufficiently lower than the threshold voltage Vth, a drain current does not flow between the source and drain. In this state, the output transistor 32 is OFF. When the output transistor 32 is turned off, the outer positive terminal 3 and the outer negative terminal 4 of the cell type power supply device are cut from each other. Accordingly, even when the external switch 14 of the external load device 11 is ON, the circuit of the external load device 11 is cut off, and the motor 15 is not driven.

When the PWM signal (gate control signal) output from the RFIC 37 is at the low-level, the output transistor 32 becomes OFF, the circuit of the external load device 11 becomes cut off, and the motor 15 is not driven. When the PWM signal output from the RFIC 37 is at the high-level, the output transistor 32 becomes ON, the circuit of the external load device 11 is brought into conduction, and the motor 15 is continuously driven. The duty cycle of the PWM signal is changed within a range of 0% to 100%. When the PWM signal is at the high-level, the transistor 32 becomes ON, current flows to the motor 15, and the motor 15 starts rotation. When the PWM signal is switched from the high-level to the low-level, the motor 15 gradually slows down its rotation because of its coil characteristics. In contrast, when the PWM signal is switched to the high-level, the rotation speeds up again. By using those characteristics, the motor 15 can be rotated at given revs by PWM control. Note that a capacitor may be used to make a short circuit between the outer positive terminal 3 and the outer negative terminal 4, and a square wave may be smoothed.

Figure 5:
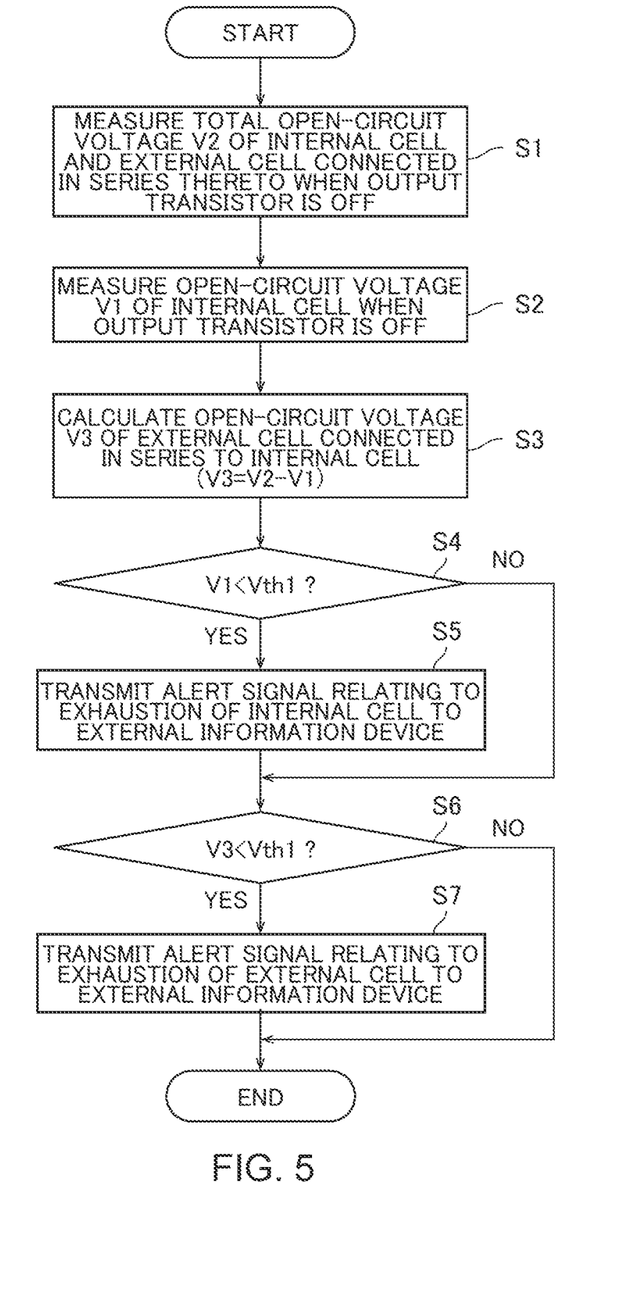
FIG. 5 is a flowchart showing a procedure of alert output processing by an RFIC shown in FIG. 1 when a cell electromotive force decreases.

The cell type power supply device 1 has a function of detecting each of a decrease in a cell voltage (cell electromotive force) of the internal cell 20 and a decrease in a cell voltage (cell electromotive force) of the external cell 13 connected in series to the internal cell 20. With a decrease in the cell voltage (cell electromotive force), an open-circuit voltage between positive and negative terminals of a cell decreases. The cell type power supply device 1 measures voltages corresponding to the respective open-circuit voltages of the internal cell 20 and the external cell 13, and in response to the measured voltage decreasing below a threshold voltage, the cell type power supply device 1 transmits an alert signal indicating the decrease in the cell voltage to the external information device 50. FIG. 5 is a flowchart showing a procedure of alert output processing by the RFIC 37 shown in FIG. 1 when the cell electromotive force decreases.

(Step S1)

The open-circuit voltage V1 of the internal cell 20 at the time when the output transistor 32 is OFF is input. The open-circuit voltage V1 is measured by the ADC 41.

(Step S2)

The total open-circuit voltage V2 of the internal cell 20 and the external cell 13 connected in series thereto at the time when the output transistor 32 is OFF is input. The total open-circuit voltage V2 is measured by the ADC 43.

(Step S3)

A difference between the total open-circuit voltage V2 of the internal cell 20 and the external cell 13 connected in series thereto, and the open-circuit voltage V1 of the internal cell 20, an open-circuit voltage V3 (=V2−V1) of the external cell 13, is calculated.

(Step S4)

The open-circuit voltage V1 of the internal cell 20 is compared with a preset threshold voltage Vth1. If the open-circuit voltage V1 of the internal cell 20 is lower than the threshold voltage Vth1, the processing by the RFIC 37 proceeds to step S5. If the open-circuit voltage V1 of the internal cell 20 is equal to or higher than the threshold voltage Vth1, a process of step S5 by the RFIC 37 is skipped. The decrease in the open-circuit voltage V1 of the internal cell 20 indicates a decrease in the cell electromotive force of the internal cell 20.

(Step S5)

An alert signal relating to exhaustion of the internal cell 20 is transmitted to the external information device 50. Receiving the alert signal, the external information device 50 displays text information for notifying a user of the exhaustion of the internal cell 20 on, for example, a built-in display unit. A transmission process of the alert signal for notifying the exhaustion of the internal cell 20 may be performed on a preset cycle or in response to an input of motor output instruction value from the external information device 50 until the open-circuit voltage V1 of the internal cell 20 becomes higher than the threshold voltage Vth1.

(Step S6)

The open-circuit voltage V3 of the external cell 13 is compared with the preset threshold voltage Vth1. If the open-circuit voltage V3 of the external cell 13 is lower than the threshold voltage Vth1, the processing by the RFIC 37 proceeds to step S7. If the open-circuit voltage V3 of the external cell 13 is equal to or higher than the threshold voltage Vth1, a process of step S7 by the RFIC 37 is skipped. The decrease in the open-circuit voltage V3 of the external cell 13 indicates a decrease in the cell electromotive force of the external cell 13.

(Step S7)

An alert signal relating to exhaustion of the external cell 13 is transmitted to the external information device 50. Receiving the alert signal, the external information device 50 displays text information for notifying a user of the exhaustion of the external cell 13 on, for example, a built-in display unit. A transmission process of the alert signal for notifying the exhaustion of the external cell 13 may be performed on a preset cycle or in response to an input of motor output instruction value from the external information device 50 until the open-circuit voltage V3 of the external cell 13 becomes higher than the threshold voltage Vth1.

The above alert output processing allows a user to check the text information displayed on the external information device 50 to grasp each of decreases in cell voltages of the internal cell 20 and the external cell 13. Here, the threshold voltage to be compared with the open-circuit voltage V1 of the internal cell 20 is assumed to be the threshold voltage to be compared with the open-circuit voltage V3 of the external cell 13, but it is noted that the threshold voltage to be compared with the open-circuit voltage V1 of the internal cell 20 may have a value different from a voltage of the threshold voltage to be compared with the open-circuit voltage V3 of the external cell 13. In addition, only one level of threshold value is provided here but a plurality of, for example, two levels of threshold value may be provided.

When the external load device 11 is a device that operates on the cell type power supply device 1 alone, the total open-circuit voltage V2 measured by the ADC 43 is substantially the same as the open-circuit voltage V1 measured by the ADC 41. Therefore, in the above alert output processing, steps S1, S3, S6, and S7 are omitted. When the external load device 11 is a device that operates on the cell type power supply device 1 and a plurality of external cells 13, that is, when the cell type power supply device 1 and the plurality of (n) external cells 13 are held in the cell box 12 with the cell type power supply device 1 connected in series to the plurality of external cells 13, an open-circuit voltage V3 per external cell 13 may be derived by dividing a difference between the total open-circuit voltage V2 and the open-circuit voltage V1 of the internal cell 20 by n (V3=(V2−V1)/n) in a calculation process in step S3 for deriving the open-circuit voltage V3 of the external cell 13.

Figure 6:
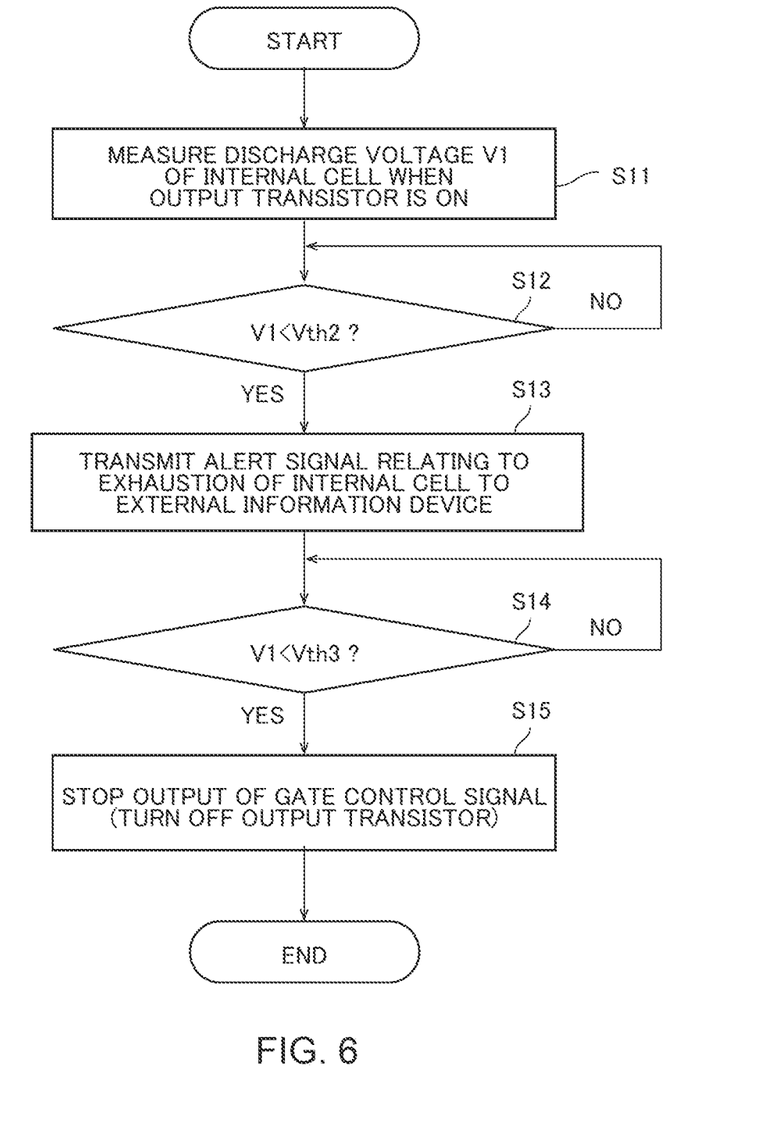
FIG. 6 is a flowchart showing a procedure of processing for outputting an alert and turning off an output transistor by the RFIC shown in FIG. 1 when the cell electromotive force decreases.

The cell type power supply device 1 may detect a decrease in the cell electromotive force of the internal cell 20 and perform a process for prolonging a cell life. FIG. 6 is a flowchart showing a procedure of processing for stopping the output transistor 32 by the RFIC 37 shown in FIG. 1 when the cell electromotive force decreases.

(Step S11)

The discharge voltage V1 of the internal cell 20 at the time when the output transistor 32 is ON is input. The discharge voltage V1 is measured by the ADC 41.

(Step S12)

The discharge voltage V1 of the internal cell 20 is compared with a preset threshold voltage Vth2. In response to the discharge voltage V1 of the internal cell 20 becoming lower than the threshold voltage Vth2, the processing by the RFIC 37 proceeds to step S13.

(Step S13)

An alert signal relating to exhaustion of the internal cell 20 is transmitted to the external information device 50. Receiving the alert signal, the external information device 50 displays text information for notifying a user of the exhaustion of the internal cell 20 on, for example, a built-in display unit. A transmission process of the alert signal may be performed on a preset cycle or in response to an input of motor output instruction value from the external information device 50 until the discharge voltage V1 of the internal cell 20 becomes higher than the threshold voltage Vth2.

(Step S14)

The discharge voltage V1 of the internal cell 20 is compared with a preset threshold voltage Vth3. The threshold voltage Vth3 has a value lower than the threshold voltage Vth2 used in step S12. In response to the discharge voltage V1 of the internal cell 20 becoming lower than the threshold voltage Vth3, the processing by the RFIC 37 proceeds to step S15.

(Step S15)

Output of the gate control signal is stopped. Specifically, processing by the drive signal generation unit of the RFIC 37 is stopped. Accordingly, the output transistor 32 is OFF. However, the connection between the RFIC 37 and the external information device 50 is kept in a communication-enabled state. The external load device 11 does not operate during a period after a process of step S15 until the internal cell 20 is replaced with a cell having an open-circuit voltage higher than a predetermined threshold voltage.

In the above output transistor stop processing, two levels of threshold value are provided. The alert signal is transmitted to the external information device 50 in response to the discharge voltage V1 of the internal cell 20 becoming lower than the threshold voltage Vth2 at a first level, and the output transistor 32 is stopped in response to the discharge voltage V1 of the internal cell 20 becoming lower than the threshold voltage Vth3 at a second level. Stopping the output transistor 32 when the cell electromotive force is left allows a state where communication with the external information device 50 is possible to be extended as compared with a case where the output transistor 32 is caused to be in normal operation, which realizes extension of a period in which a user operating the external information device 50 is notified of a state of the cell type power supply device 1, for example, a state of a decrease in the cell voltage thereof.

Figure 7:
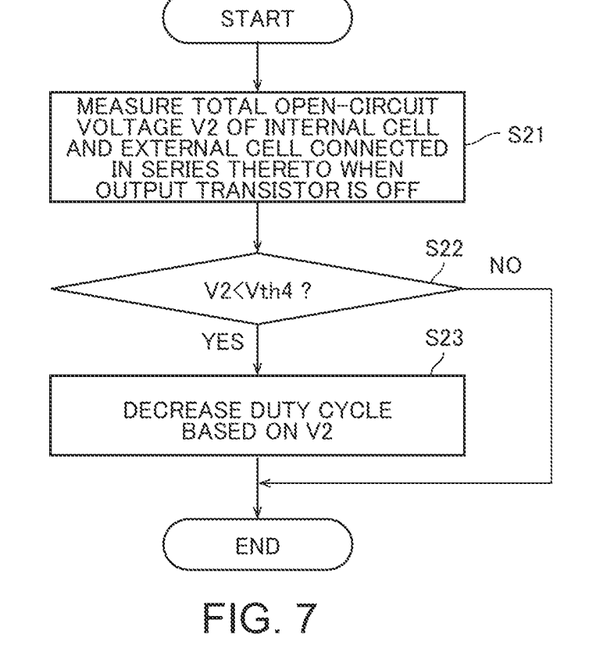
FIG. 7 is a flowchart showing a procedure of processing for controlling a duty cycle by the RFIC shown in FIG. 1 when the cell electromotive force decreases.

In order to realize the prolongation of the cell life, a duty cycle may be decreased in accordance with a total electromotive force of cells held in the cell box 12, whereby an output voltage of the cell may be decreased. FIG. 7 is a flowchart showing a procedure of processing for controlling a duty cycle by the RFIC 37 shown in FIG. 1 when the cell electromotive force decreases.

(Step S21)

The total open-circuit voltage V2 of the internal cell 20 and the external cell 13 connected in series thereto at the time when the output transistor 32 is OFF is input. The total open-circuit voltage V2 is measured by the ADC 43.

(Step S22)

The total open-circuit voltage V2 of the internal cell 20 and the external cell 13 connected in series thereto is compared with a preset threshold voltage Vth4. If the total open-circuit voltage V2 is lower than the threshold voltage Vth4, the processing by the RFIC 37 proceeds to step S23. If the total open-circuit voltage V2 is equal to or higher than the threshold voltage Vth4, a process of step S23 by the RFIC 37 is skipped, and the processing is terminated.

(Step S23)

The duty cycle is decreased based on the total open-circuit voltage V2 of the internal cell 20 and the external cell 13 connected in series thereto. For example, the drive signal generation unit generates the PWM signal in accordance with a value obtained by multiplying a motor output instruction value input by a user by a predetermined coefficient (lower than one, for example, 0.5). The value of the coefficient may be a variation that varies in accordance with the total open-circuit voltage V2 or may be a fixed value that is preset by a user or the like. For example, when a motor output instruction value selected by a user and input from the external information device 50 is 80%, the drive signal generation unit generates not a PWM signal having a 80% duty cycle but a PWM signal having a 40% duty cycle obtained by multiplying 80% by 0.5. Accordingly, a total output voltage output by the internal cell 20 and the external cell 13 connected in series thereto is decreased.

By the above processing for controlling the duty cycle, the duty cycle is decreased in response to a decrease in the total open-circuit voltage V2 (total electromotive force) of the cells attached to the cell box 12, which are the internal cell 20 and the external cell 13 connected in series thereto here, whereby the total output voltage output by the internal cell 20 and the external cell 13 connected in series thereto is decreased. Decreasing the total output voltage realizes prolongation of the cell life of each of the internal cell 20 and the external cell 13 as compared with the normal operation where the duty cycle is not controlled. The duty cycle is decreased here in response to a decrease in the total open-circuit voltage V2 (total electromotive force) of the internal cell 20 and the external cell 13 connected in series thereto, but the duty cycle may be increased. For example, in a normal operation state, when the duty cycle is set at 50%, the duty cycle is increased above 50% in response to the total open-circuit voltage V2 of the internal cell 20 and the external cell 13 connected in series thereto decreasing below a threshold voltage, whereby the total output voltage of the internal cell 20 and the external cell 13 connected in series thereto is kept or prevented from decreasing below a driving voltage of the external load device 11, so that the life of the external load device 11 in the normal operation state is prolonged. An increase width used for increasing the duty cycle may be varied in accordance with a ratio of the total open-circuit voltage V2 to the threshold value, or the duty cycle may be set at 100% in response to the total open-circuit voltage V2 decreasing below the threshold voltage.

Figure 8:
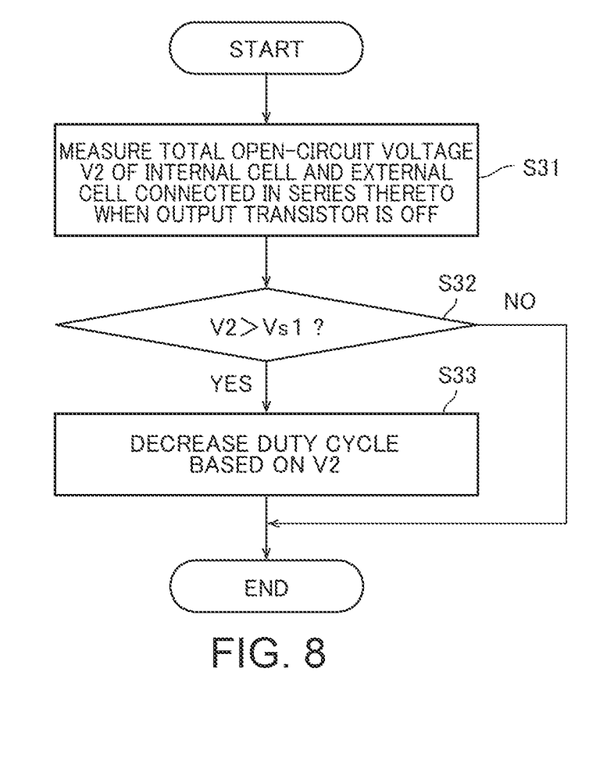
FIG. 8 is a flowchart showing a procedure of processing for controlling a duty cycle to prolong a cell life by the RFIC shown in FIG. 1.

The above processing for controlling the duty cycle is performed by the RFIC 37 in response to the decrease in the total open-circuit voltage V2 of the internal cell 20 and the external cell 13 connected in series thereto but may be performed when the total open-circuit voltage V2 of the internal cell 20 and the external cell 13 connected in series thereto is higher than a predetermined reference voltage. FIG. 8 is a flowchart showing a procedure of processing for controlling a duty cycle to prolong the cell life by the RFIC 37 shown in FIG. 1.

(Step S31)

The total open-circuit voltage V2 of the internal cell 20 and the external cell 13 connected in series thereto at the time when the output transistor 32 is OFF is input. The total open-circuit voltage V2 is measured by the ADC 43.

(Step S32)

The total open-circuit voltage V2 of the internal cell 20 and the external cell 13 connected in series thereto is compared with a preset reference voltage Vs1. The reference voltage Vs1 is set at, for example, a maximum driving voltage of the external load device 11. If the total open-circuit voltage V2 is higher than the reference voltage Vs1, the processing by the RFIC 37 proceeds to step S33. If the total open-circuit voltage V2 is equal to or lower than the reference voltage Vs1, a process of step S33 by the RFIC 37 is skipped, and the processing is terminated.

(Step S33)

The duty cycle is decreased based on the total open-circuit voltage V2 of the internal cell 20 and the external cell 13 connected in series thereto, and the reference voltage Vs1. Specifically, the RFIC 37 determines the coefficient by which the motor output instruction value is multiplied, based on a ratio of the reference voltage Vs1 to the total open-circuit voltage V2. For example, when the reference voltage Vs1 is set at 4.8 V, and the measured total open-circuit voltage V2 is 6 V, the coefficient is determined to be 0.8 by the RFIC 37. When a motor output instruction value input from the external information device 50 is 100%, the drive signal generation unit of the RFIC 37 generates a PWM signal of 80% obtained by multiplying 100% by the coefficient 0.8. Accordingly, even when the motor output instruction value is 100%, the total output voltage of the internal cell 20 and the external cell 13 connected in series thereto is equivalent to 80% of a maximum total output voltage of the internal cell 20 and the external cell 13 connected in series thereto. That is, the output voltage output by the internal cell 20 and the external cell 13 connected in series thereto is decreased below an output voltage in accordance with the input motor instruction value.

By the above processing for controlling the duty cycle, when the total open-circuit voltage V2 of the cells attached to the cell box 12, which are here the internal cell 20 and the external cell 13 connected in series thereto, is higher than the preset reference voltage Vs1, the duty cycle of the PWM signal that is actually output with respect to the duty cycle indicated by the motor output instruction value is decreased in accordance with the ratio of the reference voltage Vs1 to the total open-circuit voltage V2, whereby the total output voltage of the internal cell 20 and the external cell 13 connected in series thereto can be decreased. Decreasing the total output voltage of the internal cell 20 and the external cell 13 connected in series thereto realizes the prolongation of the cell life of each of the internal cell 20 and the external cell 13.

Figure 9:
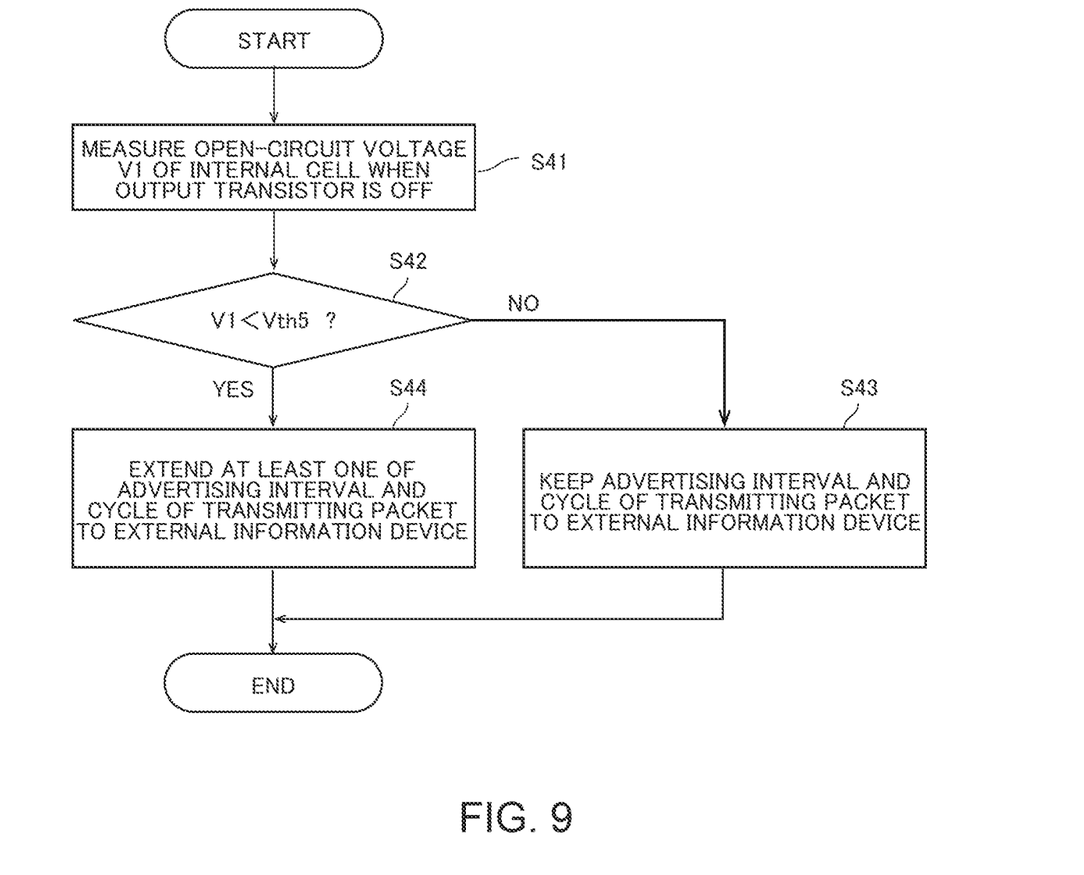
FIG. 9 is a flowchart showing a procedure of processing for extending a communication cycle by the RFIC shown in FIG. 1 when the cell electromotive force decreases.

The internal cell 20 is also consumed at the time of communication with the external information device 50. Therefore, in order to realize the prolongation of the cell life of the internal cell 20, a cycle of the communication with the external information device 50 may be extended as compared with the normal operation with a decrease in the cell electromotive force of the internal cell 20. FIG. 9 is a flowchart showing a procedure of processing for extending a communication cycle by the RFIC 37 shown in FIG. 1 when the cell electromotive force decreases.

(Step S41)

The open-circuit voltage V1 of the internal cell 20 at the time when the output transistor 32 is OFF is input. The open-circuit voltage V1 is measured by the ADC 41.

(Step S42)

The open-circuit voltage V1 of the internal cell 20 is compared with a preset threshold voltage Vth5. If the open-circuit voltage V1 is lower than the threshold voltage Vth5, the processing by the RFIC 37 proceeds to step S44. If the open-circuit voltage V1 is equal to or higher than the threshold voltage Vth5, the processing by the RFIC 37 proceeds to step S43.

(Step S43)

A cycle of searching for the external information device 50 by the cell type power supply device 1, an advertising interval, is kept. In addition, with the cell type power supply device 1 connected to the external information device 50 in a communication-enabled state, a cycle of transmitting a packet to the external information device 50 is kept. The communication is assumed here to conform to the Bluetooth® standard, but when the communication conforms to a wireless LAN standard, the advertising interval is replaced with an interval of transmitting a beacon.

(Step S44)

At least one of the advertising interval of the cell type power supply device 1 and the cycle of transmitting a packet to the external information device 50 is extended.

According to the above processing for extending the communication cycle, by extending at least one of the advertising interval and the cycle of transmitting a packet as compared with the normal operation in response to a decrease in the cell electromotive force of the internal cell 20, a voltage used for the communication with the external information device 50 is decreased, whereby the prolongation of the cell life of the internal cell 20 is realized.

In order to realize the prolongation of the cell life, the duty cycle may be determined so that the output voltage of the cells attached to the cell box 12 is equivalent to a minimum driving voltage on which the external load device 11 operates (hereafter, simply called a minimum driving voltage). The duty cycle is determined to be a minimum value at the time when the external load device 11 operates with a gate control signal for measurement having a duty cycle varying stepwise being input into the output transistor 32. Whether the external load device 11 operates can be determined from a voltage change of a drain voltage VDrain of the output transistor 32. A suitable case for such determination is a case where the external load device 11 operates on the cell type power supply device 1 alone.

Figure 10:
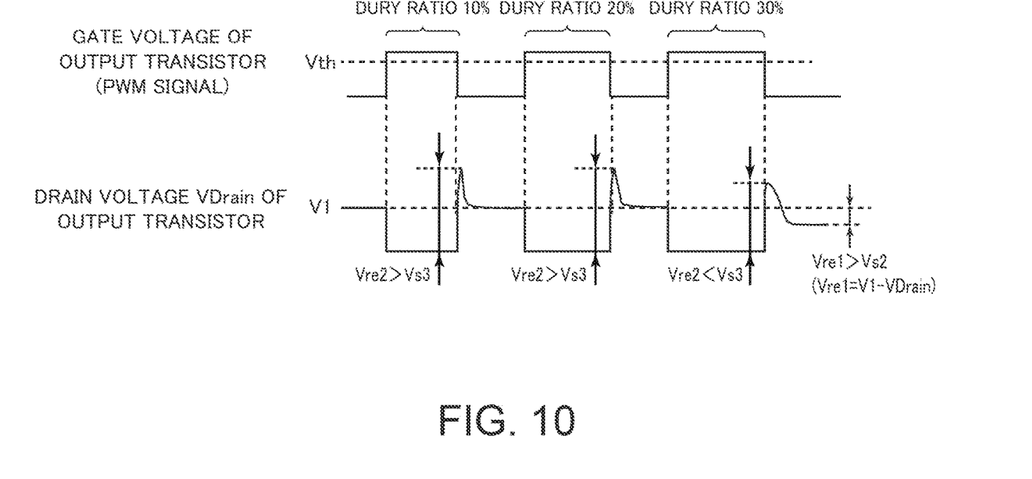
FIG. 10 is a graph showing a voltage change in accordance with whether or not a motor is rotating.

FIG. 10 is a graph showing the voltage change of the drain voltage VDrain of the output transistor 32 in accordance with whether or not the motor 15 is rotating. The drain voltage VDrain represents a potential difference between GND and the drain terminal of the output transistor 32 (the outer negative terminal 4) and is measured by the ADC 43. When the output transistor 32 is kept OFF, the drain voltage VDrain measured by the ADC 43 is substantially equivalent to the open-circuit voltage V1 of the internal cell 20 measured by the ADC 41.

As shown in FIG. 10, immediately after the PWM signal switches from the high-level to the low-level, that is, immediately after the output transistor 32 is turned off, a surge voltage Vre2 develops since the motor is an inductive load, and the drain voltage VDrain momentarily becomes higher than the open-circuit voltage V1 of the internal cell 20. The drain voltage VDrain after a lapse of a predetermined time from when the PWM signal switches from the high-level to the low-level changes in accordance with whether or not the motor 15 is rotating. When the motor 15 is not driven by an input pulse, the drain voltage VDrain at the time when the predetermined time elapses from when the input pulse switches from the high-level to the low-level asymptotically approaches the open-circuit voltage V1 of the internal cell 20. When the motor 15 is driven by an input pulse, the drain voltage VDrain at the time when the predetermined time elapses from when the input pulse switches from the high-level to the low-level takes on a low value in accordance with a rotational speed of the motor 15 rather than the open-circuit voltage V1 of the internal cell 20. This is because the coil property of the motor 15 causes the rotating motor 15 not to stop immediately but to decelerate to stop even when the PWM signal switches from the high-level to the low-level, and the circuit of the external load device 11 is cut off, and the motor 15 generates electric power during a period from when the PWM signal switches from the high-level to the low-level to the stop of the motor 15. Due to a counter electromotive voltage Vre1 generated by the rotation of the motor 15, the drain voltage VDrain measured by the ADC 43 does not recover to the open-circuit voltage V1 of the internal cell 20. The counter electromotive voltage Vre1 generated by the rotation of the motor 15 is represented by a difference between the drain voltage VDrain and the open-circuit voltage V1 of the internal cell 20. When the counter electromotive voltage Vre1 is higher than a preset reference voltage Vs2, it can be determined that the motor 15 is rotating, that is, the external load device 11 operates. As shown in FIG. 10, when pulses having a 10% duty cycle and 20% duty cycle, respectively, are input, the drain voltage VDrain at the time when the predetermined time elapses from when the input pulses switch from the high-level to the low-level is equivalent to the open-circuit voltage V1 of the internal cell 20. Therefore, it is determined that the motor 15 does not rotate on the pulses having a 10% duty cycle and a 20% duty cycle, respectively. When a pulse having a 30% duty cycle is input, the drain voltage VDrain at the time when the predetermined time elapses from when the input pulse switches from the high-level to the low-level is lower than the open-circuit voltage V1 of the internal cell 20, and the counter electromotive voltage Vre1 is higher than the reference voltage Vs2. Therefore, it is determined that the motor 15 rotates on the pulse having a 30% duty cycle. In addition, immediately after the output transistor 32 is turned off, the surge voltage Vre2 generated because of the motor being an inductive load changes in accordance with whether or not the motor 15 is rotating. This is because when the magnitude of the generated counter electromotive voltage Vre1 increases as the rotation speed of the motor 15 increases, current flowing into a motor coil decreases, and the surge voltage Vre2 decreases. Thus, when the surge voltage Vre2 is lower than a preset reference voltage Vs3, it may be determined that the motor rotates.

Figure 11:
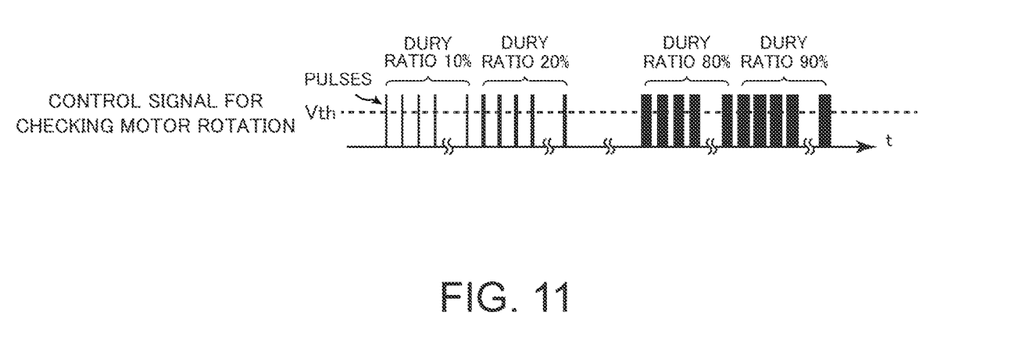
FIG. 11 is a graph showing an example of a control signal for inspecting motor rotation for the prolongation of the cell life by the RFIC shown in FIG. 1.

FIG. 11 is a graph showing an example of a control signal for inspecting motor rotation for the prolongation of the cell life by the RFIC shown in FIG. 1. The control signal for inspecting motor rotation is divided into a plurality of sections. The plurality of sections each include a pulse train having a pulse number of Np and a fixed duty cycle. For example, the pulse number Np is 100, and a value of a duty cycle is increased by 10% as a section advances from the beginning section to the last section of the control signal for inspecting motor rotation. Accordingly, the first section of the control signal for inspecting motor rotation includes a pulse train having a 10% duty cycle and a pulse number of 100, the next section includes a pulse train having a 20% duty cycle and a pulse number of 100, and the last section includes a pulse train having a 90% duty cycle and a pulse number of 100.

The RFIC 37 acquires a plurality of sample data items for which whether or not the motor 15 is rotating is determined. Specifically, as the sample data items, the RFIC 37 acquires a counter electromotive voltage Vre1 each time when a predetermined time elapses from when a pulse switches from the high-level to the low-level in the control signal for inspecting motor rotation. When a pulse number included in one section is 100, the number of samples in the one section is also 100. Increasing the number of samples enhances the accuracy of determining whether or not the motor 15 is rotating. The RFIC 37 acquires a counter electromotive voltage Vre1 each time when a predetermined time elapses from when a pulse switches from the high-level to the low-level, based on outputs of the ADCs 41 and 43, and compares the acquired counter electromotive voltage Vre1 with the reference voltage Vs2. Of the plurality of sections, the RFIC 37 determines a section where a percentage of samples having a counter electromotive voltage Vre1 higher than the reference voltage Vs2 is a predetermined percentage or more, for example, 80% or more, to be a section where the motor 15 is rotating. Accordingly, whether or not the motor 15 is rotating is determined using the duty cycle. The duty cycle is determined to be a minimum one of the duty cycles on which the motor 15 is determined to be rotating. For example, when the motor 15 is determined to be rotating in sections having duty cycles of 70%, 80%, and 90% in the control signal for inspecting motor rotation, the RFIC 37 determines the duty cycle as 70%.

When whether or not the motor 15 is rotating is determined using the surge voltage Vre2, Vre2 is acquired instead of the above Vre1, and the determination may be made from a percentage of samples where Vre2 is lower than the reference voltage Vs3.

The above processing for determining the duty cycle may be configured to be performed cyclically or immediately before the external load device 11 operates. Accordingly, the output voltage of the internal cell 20 can be made substantially equivalent to the minimum driving voltage of the external load device 11. Making the output voltage of the internal cell 20 equivalent to the minimum driving voltage of the external load device 11 decreases an operation speed and the like as compared with the normal operation, but realizes extension of a state where the external load device 11 can operate as compared with the normal operation.

Timings for acquiring the sample data items for determining whether or not the motor 15 is rotating are not limited to the above. For example, as a sample data item of a certain section, a counter electromotive voltage Vre1 at the time when a predetermined time elapses from when the last pulse of the section switches from the high-level to the low-level may be acquired. In addition, a method for determining the duty cycle is not limited to the above. According to the above method, the RFIC 37 outputs a single control signal for inspecting motor rotation to determine whether or not the motor 15 is rotating for each section of the single control signal, but the RFIC 37 may output a plurality of kinds of control signals for inspecting motor rotation having different duty cycles in an ascending order of duty cycle and determine whether or not the motor 15 is rotating for each of the output control signals. For example, the RFIC 37 outputs a control signal for inspecting motor rotation having a 10% duty cycle and a pulse number of 100 and determines whether or not the motor 15 is rotating using the same procedure as the above. When the motor 15 is determined to be rotating, the duty cycle is determined to be 10%. In contrast, when the motor 15 is determined not to be rotating, the RFIC 37 outputs a control signal for inspecting motor rotation having an increased duty cycle, for example, a 20% duty cycle and a pulse number of 100 to determine whether or not the motor 15 is rotating.

In the present embodiment, there have been described the method that detects the cell electromotive force of at least one of the internal cell 20 and the external cell 13 connected in series thereto in the cell type power supply device 1 and notifies a user of a decrease in the cell electromotive force, and the plurality of kinds of processing methods for realizing the prolongation of the cell life. The cell type power supply device 1 according to the present embodiment may include a function corresponding to one of this plurality of kinds of processing methods or may include a plurality of functions corresponding to the plurality of processing methods to allow a user to select a function to be implemented.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

1 . . . cell type power supply device including wireless function, 2 . . . cell holder, 3 . . . outer positive terminal, 4 . . . outer negative terminal, 5 . . . inner positive terminal, 6 . . . inner negative terminal, 7 . . . substrate, 8, 9, 10 . . . distribution cable, 11 . . . external load device, 13 . . . external cell, 20 . . . internal cell, 24 . . . antenna, 32 . . . output transistor, 33, 35 . . . resistor, 36 . . . DC-DC converter, 37 . . . RFIC, 41,43 . . . ADC

The invention claimed is:

1. A cell type power supply device having a wireless communication function and being attachable in a cell box of an external load device alone or in series with another external cell, the cell type power supply device comprising:
   a housing having a shape and dimensions based on a cell standard;
   a cell holder that holds an internal cell in the housing, and includes an inner positive terminal and an inner negative terminal that are brought into contact with front and rear terminals of the held internal cell;
   an outer positive terminal provided on a front end surface of the housing and connected to the inner positive terminal;
   an outer negative terminal provided on a rear end surface of the housing and connected to the inner negative terminal;
   an output transistor interposed at least one of between the inner negative terminal and the outer negative terminal and between the inner positive terminal and the outer positive terminal;
   an antenna that communicates with an external information device;
   a control unit that generates a control signal of the output transistor in accordance with a signal received via the antenna; and
   a voltage detection unit that detects at least one of voltage between the inner positive terminal and GND, and voltage between the outer negative terminal and GND.

2. The cell type power supply device according to claim 1, wherein the control unit detects a voltage detected by the voltage detection unit when the output transistor is OFF as an open-circuit voltage of the internal cell alone or an open-circuit voltage of the internal cell and the external cell.

3. The cell type power supply device according to claim 2, wherein the control unit transmits a signal indicating a decrease in a cell voltage to the external information device when the detected voltage is lower than a threshold value.

4. The cell type power supply device according to claim 2, wherein when the detected open-circuit voltage is lower than a threshold value, the control unit decreases or increases a duty cycle of the control signal below or above a duty cycle of a time when the detected open-circuit voltage is higher than the threshold value.

5. The cell type power supply device according to claim 2, wherein the control unit decreases a duty cycle of the control signal when the detected open-circuit voltage is higher than a threshold value.

6. The cell type power supply device according to claim 2, wherein when the detected open-circuit voltage is lower than a threshold value, the control unit makes a cycle for communication with the external information device longer than a cycle for communication of a time when the detected open-circuit voltage is higher than the threshold value.

7. The cell type power supply device according to claim 1, wherein the external load device includes a motor as a load, and the control unit generates an inspection control signal having a variable duty cycle and determines a duty cycle for rotating the motor based on a change in voltage between the outer positive terminal and the outer negative terminal.

* * * * *